(12) United States Patent
Zeif

(10) Patent No.: US 6,584,739 B2
(45) Date of Patent: Jul. 1, 2003

(54) APPLIED EDGE TRIM

(75) Inventor: Alex Zeif, Summerville, SC (US)

(73) Assignee: Maxcess Technologies, Inc., Summerville, SC (US)

(*) Notice: Subject to any disclaimer, the term of this patent is extended or adjusted under 35 U.S.C. 154(b) by 0 days.

(21) Appl. No.: 09/797,187

(22) Filed: Mar. 1, 2001

(65) Prior Publication Data

US 2003/0056454 A1 Mar. 27, 2003

Related U.S. Application Data

(60) Provisional application No. 60/187,603, filed on Mar. 7, 2000.

(51) Int. Cl.$^7$ .............................. E04B 1/00; E04F 11/16
(52) U.S. Cl. ............................................ 52/263; 52/177
(58) Field of Search ....................... 52/263, 177, 800.1, 52/800.11, 800.12, 800.13

(56) References Cited

U.S. PATENT DOCUMENTS

| | | |
|---|---|---|
| 232,965 A | 10/1880 | Hastings |
| 708,842 A | 9/1902 | Stille et al. |
| 1,583,748 A | 5/1926 | Reuter-Lorenzen |
| 1,845,579 A | 2/1932 | Borthwick |
| 1,869,702 A | 8/1932 | MacChesney |
| 1,979,309 A | 11/1934 | Beiger |
| 2,027,292 A | 1/1936 | Rockwell |
| 2,099,809 A | 11/1937 | Hunter et al. |
| 2,245,468 A | 6/1941 | Dussol |
| 2,717,187 A | 9/1955 | Morgan et al. |
| 2,957,737 A | * 10/1960 | Irwin |
| 3,247,638 A | 4/1966 | Gay, Jr. |
| 3,443,349 A | 5/1969 | Mahle |
| 3,548,559 A | 12/1970 | Levine |
| 3,604,168 A | 9/1971 | Meineke |
| 3,616,127 A | 10/1971 | Guenther |
| 3,665,662 A | 5/1972 | Timbrook et al. |

(List continued on next page.)

FOREIGN PATENT DOCUMENTS

| | | |
|---|---|---|
| DE | 6750305 | 1/1969 |
| DE | 2409746 | 9/1975 |
| DE | 2747590 | 4/1978 |
| DE | 3142446 A1 | 5/1983 |
| DE | 3238708 A1 | 4/1984 |
| DE | 3223569 C2 | 8/1985 |
| GB | 429301 | 6/1935 |
| GB | 1291690 | 10/1972 |
| GB | 1590540 | 6/1981 |

OTHER PUBLICATIONS

Maxcess Technologies illustration used from 1995–1999.*
Illustration of access floor product sold by Maxcess Technologies, Inc. from 1995 to Jan. 1999.

Primary Examiner—Carl D. Friedman
Assistant Examiner—Kevin McDermott
(74) Attorney, Agent, or Firm—Needle & Rosenberg, P.C.

(57) ABSTRACT

An access floor panel having an improved applied edge trim element comprising a panel base capable of being suspended above a subfloor surface, having a load surface for supporting loads, and a method for forming such an edge trim element. Affixed to the load surface is a covering comprising a top layer having a thickness and an underlying backing layer. The covering further comprises a wear surface with a central portion and perimeter edges therearound, the wear surface along the perimeter edges of the covering being etched to a depth that is less than the thickness of the top layer. An edge trim element, such as ink, is applied to the etched portion of the covering, providing an aesthetically pleasing appearance to the access floor panel.

12 Claims, 2 Drawing Sheets

U.S. PATENT DOCUMENTS

| | | | |
|---|---|---|---|
| 3,696,578 A | 10/1972 | Swensen et al. |
| 3,703,431 A | 11/1972 | Kemper |
| 3,729,883 A | 5/1973 | Thompson |
| 3,732,657 A | 5/1973 | Nelsson |
| 3,767,516 A | 10/1973 | Brady |
| 3,868,802 A | 3/1975 | Schubach |
| 3,908,588 A | * 9/1975 | Daunheimer |
| 3,941,631 A | 3/1976 | Kirk et al. |
| 3,948,347 A | 4/1976 | Rutledge |
| 4,005,239 A | 1/1977 | Davis et al. |
| 4,035,967 A | * 7/1977 | Harvey |
| 4,051,642 A | 10/1977 | Terry |
| 4,067,156 A | 1/1978 | Downing, Jr. |
| 4,113,219 A | 9/1978 | Mieyal |
| 4,203,268 A | 5/1980 | Gladden, Jr. et al. |
| D258,536 S | 3/1981 | Kay |
| 4,254,077 A | 3/1981 | Fontana et al. |
| 4,319,520 A | 3/1982 | Lanting et al. |
| 4,348,442 A | 9/1982 | Figge |
| 4,365,436 A | 12/1982 | Ritchey |
| 4,390,580 A | 6/1983 | Donovan et al. |
| 4,411,121 A | 10/1983 | Blacklin et al. |
| 4,426,824 A | * 1/1984 | Swenson |
| 4,447,998 A | * 5/1984 | Griffin |
| 4,484,426 A | 11/1984 | Simms |
| 4,561,232 A | 12/1985 | Gladden, Jr. et al. |
| 4,574,555 A | * 3/1986 | Cline |
| 4,579,767 A | * 4/1986 | Coggan |
| 4,594,833 A | 6/1986 | Mieyal |
| 4,625,491 A | * 12/1986 | Gibson |
| 4,656,795 A | 4/1987 | Albrecht et al. |
| 4,671,832 A | 6/1987 | Cline |
| 4,689,870 A | 9/1987 | Mieyal |
| 4,716,840 A | * 1/1988 | Tringali |
| 4,731,139 A | 3/1988 | Feyerabend et al. |
| 4,927,070 A | 5/1990 | Kretchmer |
| 4,942,708 A | 7/1990 | Krumholz et al. |
| 5,001,883 A | 3/1991 | Landheer |
| 5,048,242 A | 9/1991 | Cline |
| 5,052,160 A | 10/1991 | Gentsch et al. |
| D350,613 S | 9/1994 | Fahy, Jr. |
| D370,060 S | 5/1996 | Fahy, Jr. |
| 5,628,157 A | 5/1997 | Chen |
| 6,061,985 A | * 5/2000 | Kraus |

* cited by examiner

APPLIED EDGE TRIM

RELATED U.S. APPLICATION DATA

This application claims priority to U.S. Provisional Application Serial No. 60/187,603, filed on Mar. 7, 2000. The 60/187,603 provisional patent application is herein incorporated by this reference in its entirety.

BACKGROUND OF THE INVENTION

1. Field of the Invention

The invention relates to floor systems, and specifically, to an edge trim for access floor systems incorporating access floor panels.

2. Background Art

Access floor systems, also referred to as "raised floors," "computer floors," or "elevated floors," have been utilized in a variety of applications in which a plenum, void or cavity beneath a floor surface is required by the user. Traditionally, access floor systems have been heavily utilized in computer room environments, in which a significant amount of interstitial space beneath the floor structure is required to accommodate and manage cables, components and other electrical services. Increasingly, however, demand for access floor systems has grown as usage of access floor systems has become more common in other building environments such as cleanrooms, equipment rooms, and general purpose office space. Such applications benefit from other uses of the space beneath the floor surface, such as housing HVAC componentry or other mechanical services.

An access floor system is made up of a plurality of individual, modular access floor panels supported on a series of pedestals which may be of a fixed height or are adjustable in height. When assembled, the access floor panels form a deck upon which the contents of the room rest. Each access floor panel is a modular unit, which is removable, replaceable, and interchangeable with other panels and is constructed to meet the performance requirements of the entire floor system, including, for example, load bearing requirements, combustibility resistance, and corrosion resistance.

Access floor panels are commonly constructed of a formed steel bottom pan fixedly attached to a load surface which supports a floor covering that forms the actual flooring surface. Due to standard requirements for static electricity dissipation and the desire for an aesthetically pleasing appearance and a smooth rolling surface, access floor panels for use in computer and equipment room applications commonly utilize a floor covering of high pressure laminate or other floor tile materials having a hard, resilient surface. It is these types of applications to which the present invention is particularly directed.

Frequently, unavoidable slight misalignments between neighboring panels create a narrow void between panel edges, which appears as an aesthetically undesirable dark line. Additionally, floor covering materials are frequently brittle and susceptible to cracking under rough wear conditions at the panel edges. Chipping or cracking is problematic in all access floor systems, because it often results in exposure to view of the unsightly interior of the floor covering and degradation of panel stability at the edges. Accordingly, an "edge trim" is frequently applied to or formed within the floor covering or the panel around its perimeter. The edge trim should be capable of withstanding rough handling during installation and removal and severe use conditions, and should maintain at all times the structural properties required by the panel system.

Current art has attempted to satisfy these requirements in several ways. Edge trim strips and corner pieces have been utilized which are formed to engage an edge flange of the access floor bottom pan or load surface. Such systems suffer the disadvantage of frequent breakage or separation from the panel assembly. Other systems have been utilized wherein the edge portion of a non-standard high pressure laminate material is removed to expose specially formulated uniformly colored laminate core layers, forming an "integral" trim. Such systems suffer from increased material cost and increased process control costs, as well as the presence of a relatively deep "groove" between adjacent panels that tends to collect dust, water or other contaminants between panels.

SUMMARY OF THE INVENTION

The disadvantages of the prior art are overcome by the present invention, which in one aspect, is an improved access floor panel having a printed edge trim. The invention includes an access floor panel including a panel base capable of being suspended above a subfloor surface and having a load surface for supporting loads. A floor covering, affixed to the load surface, is formed from a material having a top layer and a backing layer underlying the top layer. The top layer has a thickness, and in some coverings, one or more distinct materials may make up the top layer, such as in coverings where a decorative layer is provided below a transparent or translucent wear layer. The topmost surface, or wear surface, of the covering includes a central portion and perimeter edges therearound. The wear surface along the perimeter edges of the covering is etched to a depth that is less than the thickness of the top layer, such that no portion of the underlying backing layer is exposed. An edge trim element is then applied to the etched portion of the covering.

DETAILED DESCRIPTION OF THE INVENTION

The present invention is more particularly described in the following examples that are intended as illustrative only since numerous modifications and variations therein will be apparent to those skilled in the art. As used in the specification and in the claims, "a," "an," or "the" can mean one or more, depending upon the context in which it is used. The preferred embodiment is now described with reference to the figures, in which like numbers indicate like parts throughout the figures.

The present invention provides a neat, accurate, functional, cost-effective and aesthetically pleasing edge trim along the perimeter of an access floor panel. In addition, the edge trim should be durable.

Figure 1:
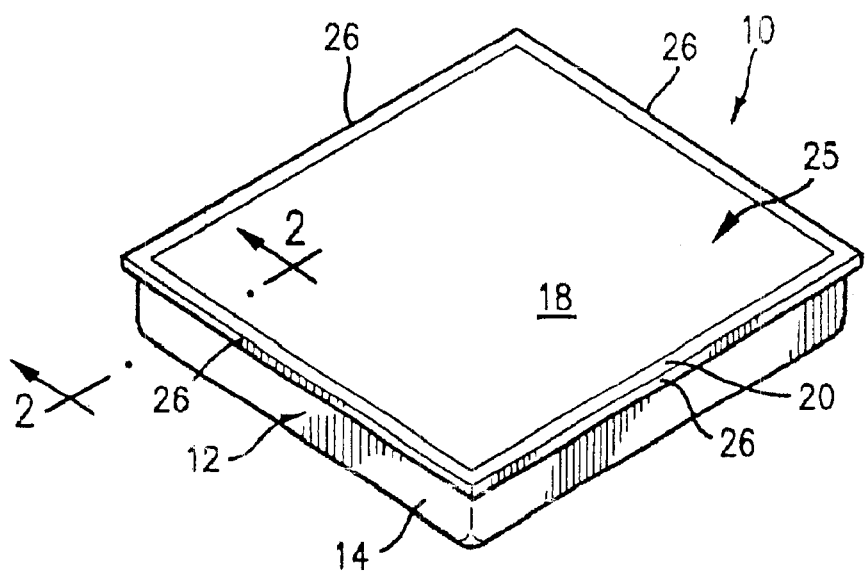
FIG. 1 is a perspective view of an access floor panel according to the present invention.
Figure 2:
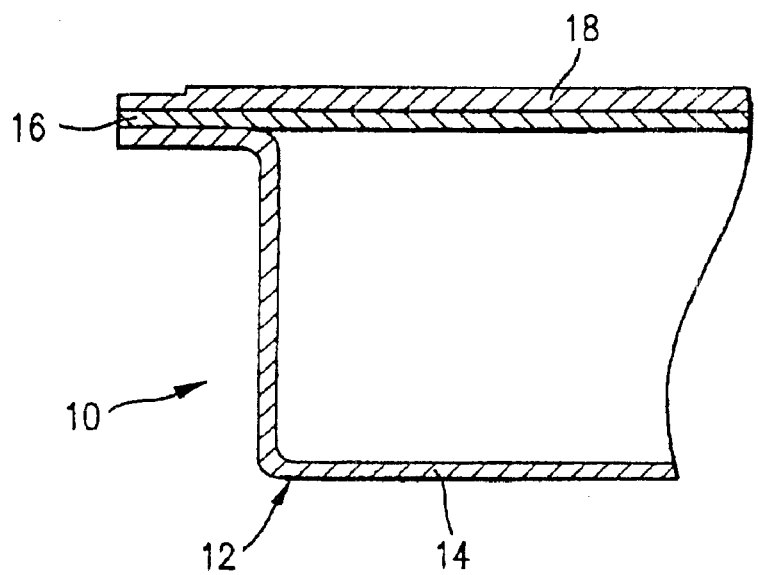
FIG. 2 is a cross-sectional side view of a portion of an access floor panel according to the present invention, taken along line 2—2 in FIG. 1.
Figure 3:
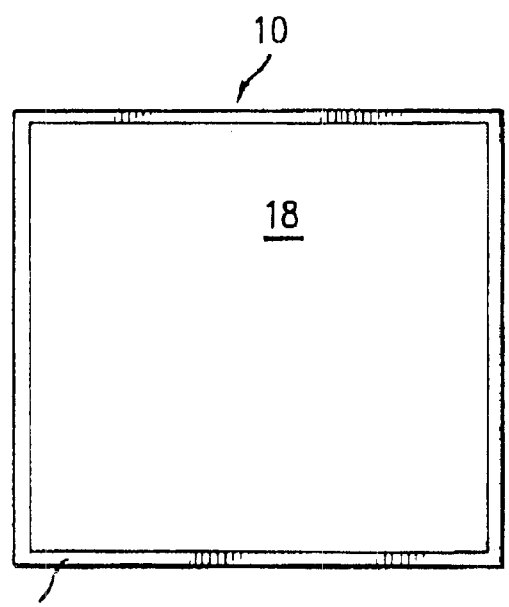
FIG. 3 is a top plan view of an access floor panel according to the present invention.

Referring to FIGS. 1 and 2, in one embodiment, the invention is an improved access floor panel 10 having a printed edge trim element 20. An access floor panel 10 is provided including a panel base 12 capable of being suspended above a subfloor. The panel base 12 may be constructed of a variety of rigid materials, including aluminum and stamped sheet metal. In the illustrated embodiment, the panel base 12 has a bottom pan 14 fixedly attached to a load surface 16 for supporting loads. A covering 18, which forms the visible surface of the access floor panel 10, is fixedly attached to the load surface 16 by conventional means, such as an adhesive.

Access floor panel coverings may be selected from a variety of materials, including carpet, vinyl, vinyl composite tile, PVC and high pressure laminate ("HPL") materials, such as those commonly used in countertop or conventional flooring applications. Though this invention may be utilized in access floor panels having any covering, the invention is utilized mainly in applications where an HPL laminate floor covering, commercially available under trade names including Formica, Nevamar or Wilsonart, forms the covering of the access floor panel.

Figure 4:
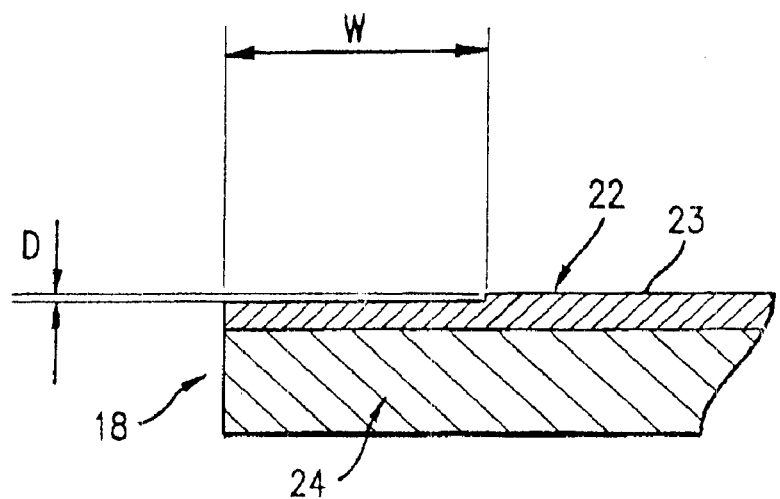
FIG. 4 is an enlarged cross-sectional side view of a portion of the covering of the access floor panel shown in FIG. 2.
Figure 5:
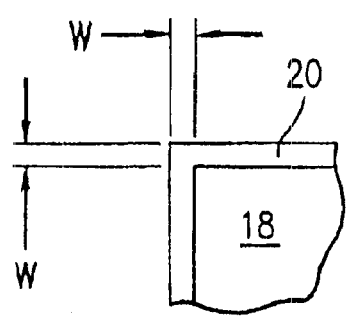
FIG. 5 is an enlarged top plan view of a portion of the access floor panel shown in FIG. 3.

In the embodiment shown in FIG. 4, the covering 18 is formed from an HPL floor tile having a top layer 22 and an underlying backing layer 24. The top layer 22 of an HPL tile includes one or more thin, durable, water-resistant and transparent wear sheets (not shown) bonded to one or more sheets of decorative paper that form the visible surface of the floor covering 18. The topmost surface, or wear surface 23, of the covering includes a central portion 25 and perimeter edges 26 therearound. Preferably, the wear surface 23 of the covering 18 is hard and resilient to resist damage and wear resulting from extended use.

The backing layer 24 in such an embodiment is composed of a plurality of laminated kraft paper backing sheets, horizontally extending beneath the top layer 22. The sheets which make up the top layer 22 and the backing layer 24 are collectively laminated together to make up the full laminate thickness, as is well known in the art of HPL floor coverings.

Coverings constructed of materials other than HPL may also be utilized. In some embodiments, the top layer of such floor coverings includes one or more wear sheets which provide durability and water resistance to the covering. The backing layer, which is bonded to the top layer, may be constructed of any material capable of maintaining the required structural properties of the covering.

To form the edge trim element 20, the wear surface 23 along the perimeter edges 26 of the covering 18 is etched to a depth D that is less than the thickness of the top layer 22 (i.e., to a depth that does not result in any portion of the underlying backing layer 24 of the covering 18 being exposed to view). As discussed in this specification, the terms "etch," "etched" and "etching" should be understood to refer to a procedure whereby at least a portion of the covering 18 is removed or disturbed such that a portion of only the top layer 22 is penetrated or removed, in preparation for the addition of the edge trim element 20. According to the invention, a portion of the top layer 22 is etched in preparation for the application of the edge trim element 20, but the covering 18 is never etched to a depth whereby the top layer 22 is completely removed such that any portion of the underlying backing layer 24 would be exposed.

The covering 18 should be etched to a width W that enables the application of an edge trim element 20 of a suitable width to achieve the aesthetic and functional requirements of the system. Any width W is therefore acceptable, according to the preference of the user. In the presently preferred embodiment, widths W in the range of 0.105 inches to 0.135 inches have been found to be acceptable, and a width of 0.115 inches has been found to be most suitable.

The covering 18 should be etched to a depth D in preparation for the application of the edge trim element 20. Etching the covering 18 to any depth D that is less than the thickness of the top layer 22 has been found to be acceptable. For example, if the thickness of the top layer 22 is 0.004 inches, etching to any depth less than 0.004 inches has been found to produce an acceptable result. In the presently preferred embodiment, in which the top layer 22 has a thickness of 0.004 inches, a depth D of as little as 0.0005 inches has been found to produce an acceptable result, and depths D of between 0.0015 inches and 0.0030 inches have been found to be preferable.

Those skilled in the art will appreciate that further variations in the dimensions of the etched area are possible, except that the depth D of the etched area should not exceed the thickness of the top layer 22. Additionally, though the etched area is illustrated as a rectangular cross-sectional recess in FIG. 4, one skilled in the art will appreciate that other configurations of the etched recess may be provided, such as U-shaped or V-shaped, provided that aesthetic requirements are met, and provided that the depth D does not exceed the thickness of the top layer 22.

To etch the covering 18, a heat generating laser (not shown) with appropriate optics may be utilized to burn a recess into the edge of the covering 18. The depth of the laser etching may be controlled by a variety of parameters, including the power capacity of the laser system, the distance of the wear surface 23 from the focal point of the laser beam, and the speed at which the laser beam traverses the covering 18. It has been found to be beneficial to minimize the "step" or recess cut into the edge of the covering 18. Such a recess results in a groove between adjoining access floor panels 10 which results in increased noise and vibration when loads are rolled across the access floor system. The groove also reduces the structural rigidity of the system by decreasing the thickness of the covering 18 at the panel perimeter edges 26, and makes the perimeter edges 26 more susceptible to cracking and splitting. To reduce the detrimental effect of such a groove, it is beneficial to etch the covering 18 only to a depth which makes application and retention of the edge trim element 20 possible.

Thus, the top layer 22 of the covering 18 is etched such that any protective wear- or water-resistant covering provided on the top surface is removed or abraded and such that the remaining exposed surface of the top layer 22 is receptive to the application of the edge trim element 20. At no time is the top layer 22 completely removed such that the laser penetrates into the underlying backing layer 24. By removing or abrading any non-porous surface treatment from the covering 18, that portion of the top layer 22 which has been removed may be penetrated by fluid ink or other selected materials applied to the etched area to form an edge trim element 20.

A two-axis DNC 150 watt sealed $CO_2$ laser system provides sufficient power and precision to provide sufficient etching to the top surface of the covering. Such systems are manufactured by several companies, including Beam Dynamics, Inc. in San Carlos, Calif. In the preferred embodiment, an elongated oval laser beam positioned at an axial rotation of approximately 30 degrees has been found to produce satisfactory results when focused at an after-focus width of approximately 0.140 inches to 0.180 inches and moved at a feed rate of 450 to 480 inches per minute.

Satisfactory results have been achieved with a cylindrical laser cutting lens. Such laser cutting lenses are available from manufacturers including Preco Industries Inc., based in Lenexa, Kans.

Alternatively, the etching may be performed by other conventional means, such as by routing, grinding, sanding, sandblasting or the application of acid or other chemicals. Other etching methods not specifically described herein may also be utilized to etch the covering 18, and are considered to fall within the scope of the invention.

According to the mechanical etching processes described above, a router bit, grinding wheel or other rotating tool (not shown) may be brought into contact with the perimeter edge of the floor tile. By controlling the operation of the tool relative to the floor tile, both the depth and width of the resulting cut may be maintained. It is desirable to limit the depth of the etching to remove only a portion of the top layer of the covering of the floor panel. Similarly, etching may be performed by sandblasting or application of chemical solutions to the covering. When the etching step is completed, the edge of the floor tile is prepared to receive an edge trim element to provide the finished edge of the access floor panel.

The methods and devices disclosed in this application may also be used to provide a decorative appearance to areas of the covering other than the perimeter edges. For example, interior portions of the top layer of the covering may be etched as disclosed above in the shape of decorative patterns, corporate logos or trademarks selected by the user. After etching the top layer in the shape of the selected pattern, an edge trim element may be applied to this etched top layer as described below to provide a visually satisfying and structurally sound finished floor covering.

The edge trim element 20, which in one embodiment is a liquid permanent ink or paint, may be applied to the etched portion of the floor tile by a variety of processes. Ink may be applied by manual or automated use of an ink marker containing an appropriately colored ink. Alternatively, a paintbrush may be manually or automatically used to apply ink to the etched portion of the covering. In other embodiments, automated ink applying devices such as ink jet, laser jet, bubble jet or other printer technology may be utilized to apply ink. Such devices may be utilized as long as they satisfy the volumetric demands and accuracy requirements of the manufacturing process.

Ink may be applied to the etched portion of the covering by other automated devices, including ink applying devices or screen printing machines. Printing speed and accuracy needs are sufficiently met by the use of a flat bed screen printing machine having a 1400×1000 mm print area, such as that manufactured by Maschinenbau Bochonow of Besigheim, Germany. The screen printing system enables the covering to be fastened to a printing table by a strong, adjustable vacuum during printing. A polyester screen is then placed over the covering, which is provided with a blocked area corresponding to a "negative" of the desired printing pattern. Thus, to create the embodiment of the edge trim element described in this specification, the screen is constructed such that ink passes through the screen only at the perimeter edges of the covering, corresponding to the etched area of the top layer. Ink is then applied to the covering through the screen, creating a highly accurate and precisely controlled application of ink to form the edge trim element 20.

The edge trim element 20 should be resistant to chemicals commonly used to clean the floor surface during subsequent manufacturing operations, as well as by the end user of the access floor system. Additionally, the edge trim element 20 should be resistant to the abrasion of daily foot traffic and other office traffic such as casters of rolling office equipment.

Ink utilized in the above-described embodiment of the edge trim element 20 should have suitable viscosity, coverage ability and pot life, along with sufficient durability and aesthetics after the ink dries to a suitable set. A currently preferred ink formulation is Ruco 985-UV series printing ink, in black or brown, which can be purchased from Diversified Printing Techniques, Inc. in Charlotte, N.C. The currently preferred ink includes 7.5% hardener and 2% varnish.

Other formulations of the edge trim element 20 may be provided according to the invention, as long as the trim material utilized is sufficiently bonded to the etched perimeter edge of the floor tile to avoid detachment of the trim edge element 20. For example, solid (such as powder) ink formulations may be utilized as an alternative to liquid ink. Additionally, solid trim elements fixed to the etched edge of the covering may be utilized to form the edge trim element. The slightly recessed edge of the floor tile advantageously provides protection of such adhesively applied trim elements from scuffing and damage from lateral or sliding loads applied in the installation environment.

When installed, the edge trim element 20 is preferably contained within the groove formed in the covering 18 by the etching process. In such an embodiment, the edge trim member 20 is below or even with the central portion of the top surface 22, such that the resulting wear surface of the covering 18 is substantially a planar surface. The tendency of the groove to collect moisture, dirt and other contaminants is minimized, and less noise is created when rolling loads are moved across neighboring access floor panels 10.

Additionally, ink may be selected that exhibits resistance to moisture penetrating and chemical resistance, thereby lengthening the life of the covering 18.

To provide an aesthetically pleasing appearance, materials which contrast with the top layer 22 in color may be used to form the edge trim element 20. Dark inks or other edge trim materials, such as black or brown, may be used. A dark color may also be most effective in masking imperfect alignment between neighboring access floor panels, such as a void between imperfectly fit panels which often gives the appearance of a dark or black line. Other colors of ink may be utilized, however, according to the preference of the user.

In another aspect, the covering 18 of the invention may be utilized as a traditional floor covering, independent of any panel base or other components of an access floor system. For example, the covering 18 may be directly applied to the subfloor surface in household, commercial or industrial environments.

In another aspect, the invention is a method of forming an access floor covering. The method of the invention includes the steps of selecting a floor covering 18 with a top layer 22 having a thickness and an underlying backing layer 24, the covering 18 having wear surface 23 with a central portion 25 and perimeter edges 26 therearound; etching at least a portion of the wear surface 23 along the perimeter edges 26 of the covering 18 to a depth D that is less than the thickness of the top layer 22; and applying an edge trim element 20 to the etched portion of the covering 18.

In one embodiment, the etching step is performed by feeding a pre-sized and pre-cut piece of HPL floor covering onto the carriage of a computer controlled table (such as a CNC, DNC or CAM controlled machine). The table may provide for automated control of the position of the covering with respect to a laser cutting beam, as described above. It is anticipated that the covering may be held steady while the laser beam is manipulated, or that the laser beam may be stationary with controlled movement of the covering, or some combination of those options. The intensity and focus of the laser beam may be controlled by the user, as well as the speed at which the laser beam traverses the floor covering, such that the top surface of the covering is etched to a depth that does not exceed the thickness of the top layer.

In one embodiment, the etching step is performed in two "passes." A square covering is received into and secured within a laser machining unit. The covering is held stationary within the machining unit, while a pair of moveable laser beams traverse the longitudinal edges of the square covering. Thus, the longitudinal edges of the covering are simultaneously etched by the laser beams as the beams traverse the longitudinal edges, each of the longitudinal edges being contacted by a separate stationary laser beam within the machining unit. After the first pass is completed, the covering is removed from the machining unit, rotated 90 degrees and returned to the machining unit for the second pass, such that the latitudinal edges may be similarly etched, forming a completely etched covering. Machining units capable of performing the etching step in a single "pass" are also possible according to the invention.

Alternately, of course, a machining unit with stationary laser beams may be utilized according to the invention. In such an embodiment, the covering may be received within the machining unit and transported through the machining unit along a longitudinal axis that is parallel to the two longitudinal edges of the covering. The longitudinal edges are etched as they are contacted by the stationary laser beams within the machining unit.

In the presently preferred embodiment, the covering 18 is placed onto the carriage of a DNC laser system machine and is automatically carried into the working area of the laser. An elongated oval shaped laser beam, adjusted to an "after-focus" height and rotated off-parallel to achieve the preferred beam width described above, travels around the perimeter of the covering 18 at the above-referenced speed and power output to etch the covering 18.

The etching step of the method of the present invention may also include an optional cleaning step, in which any debris, soot or ash are removed from the covering 18. In the presently preferred embodiment, the covering 18 is sprayed with a high-pressure, low-volume water mist to wet the covering 18. It is then scrubbed with high-speed rotating bristle brushes to remove any debris. Any residue is then removed with a vacuum. Alternatively, other methods may be utilized to remove debris from the covering 18, as those skilled in the art will appreciate.

In the presently preferred embodiment, once the covering 18 has been etched, the covering 18 is transferred to a screen printing station, where a layer of ink is applied to the previously etched area of the top surface. The covering may then be moved to a drying station, such as a convection, ultraviolet or radiant heat oven. In embodiments of the invention in which an ultraviolet curing ink formulation is utilized, one suitable drying station that utilizes ultraviolet light to cure the edge trim element is manufactured by Satos and distributed by Diversified Printing Techniques in Charlotte, N.C. A conveyorized ultraviolet drying tunnel with a 9600 watt ultraviolet lamp has been found to produce acceptable results.

Alternately, the covering may be left to dry without assistance from a drying unit. After drying is completed, the covering may be attached to other access floor panel components as needed and is ready for use.

Although the present invention has been described with reference to specific details of certain embodiments thereof, it is not intended that such details should be regarded as limitations upon the scope of the invention except as and to the extent that they are included in the accompanying claims.

What is claimed is:

1. An access floor panel, comprising:

a. a panel base having a top load surface for supporting loads;

b. a covering affixed to the load surface, comprising a top layer having a thickness and a backing layer underlying the top layer, the covering further comprising a wear surface having a central portion and perimeter edges therearound, the wear surface along at least a portion of the perimeter edges of the covering being etched to a depth that is less than the thickness of the top layer; and c. an edge trim element applied to the etched portion of the covering, wherein the perimeter edges of the covering are etched to a depth of less than 0.0040 inches.

2. The access floor panel of claim 1, wherein the edge trim element comprises a predetermined amount of ink applied to the etched portion of the covering.

3. The access floor panel of claim 2, wherein the ink is of a color which contrasts in appearance with the top layer.

4. The access floor panel of claim 1, wherein the covering comprises high pressure laminate.

5. An access floor panel, comprising:

a. a panel base having a top load surface for supporting loads;

b. a covering affixed to the load surface, comprising a top layer having a thickness and a backing layer underlying the top layer, the covering further comprising a wear surface having a central portion and perimeter edges therearound, the wear surface along at least a portion of the perimeter edges of the covering being etched to a depth that is less than the thickness of the top layer; and c. an edge trim element applied to the etched portion of the covering, wherein the perimeter edges of the covering are etched to a depth of less than 0.0030 inches.

6. An access floor panel, comprising:

a. a panel base having a top load surface for supporting loads;

b. a covering affixed to the load surface, comprising a top layer having a thickness and a backing layer underlying the top layer, the covering further comprising a wear surface having a central portion and perimeter edges therearound, the wear surface along at least a portion of the perimeter edges of the covering being etched to a depth that is less than the thickness of the top layer; and c. an edge trim element applied to the etched portion of the covering, wherein the perimeter edges of the covering are etched to a depth between 0.0015 and 0.0030 inches.

7. A floor covering, comprising:

a. a top layer having a thickness and a backing layer underlying the top layer, the covering further comprising a wear surface having a central portion and perimeter edges therearound, the wear surface along at least a portion of the perimeter edges of the covering being etched to a depth that is less than the thickness of the top layer; and b. an edge trim element applied to the etched portion of the covering, wherein the perimeter edges of the covering are etched to a depth of less than 0.0040 inches.

8. The floor covering of claim 7, wherein the edge trim element comprises a predetermined amount of ink applied to the etched portion of the covering.

9. The floor covering of claim 8, wherein the ink is of a color which contrasts in appearance with the top layer.

10. The floor covering of claim 7, wherein the covering comprises high pressure laminate.

11. A floor covering, comprising:

a. a top layer having a thickness and a backing layer underlying the top layer, the covering further comprising a wear surface having a central portion and perimeter edges therearound, the wear surface along at least a portion of the perimeter edges of the covering being etched to a depth that is less than the thickness of the top layer; and b. an edge trim element applied to the etched portion of the covering, wherein the perimeter edges of the covering are etched to a depth of less than 0.0030 inches.

12. A floor covering, comprising:

a. a top layer having a thickness and a backing layer underlying the top layer, the covering further comprising a wear surface having a central portion and perimeter edges therearound, the wear surface along at least a portion of the perimeter edges of the covering being etched to a depth that is less than the thickness of the top layer; and b. an edge trim element applied to the etched portion of the covering, wherein the perimeter edges of the covering are etched to a depth between 0.0015 and 0.0030 inches.

* * * * *